United States Patent [19]

Donovan

[11] Patent Number: 4,574,105

[45] Date of Patent: Mar. 4, 1986

[54] PENETRATION RESISTANT TEXTILE PANELS WITH PLIES OF NYLON AND PLIES OF KEVLAR

[75] Inventor: James G. Donovan, Norwell, Mass.

[73] Assignee: Albany International Corp., Albany, N.Y.

[21] Appl. No.: 580,438

[22] Filed: Feb. 15, 1984

[51] Int. Cl.$^4$ .............................................. B32B 5/02
[52] U.S. Cl. .................................. 428/233; 428/234; 428/252; 428/474.9; 428/911
[58] Field of Search ............ 428/233, 234, 252, 474.9, 428/911

[56] References Cited

U.S. PATENT DOCUMENTS

| 4,079,464 | 3/1978 | Roggin | 428/911 |
| 4,181,768 | 1/1980 | Severin | 428/911 |
| 4,183,097 | 1/1980 | Mellian | 428/911 |
| 4,186,648 | 2/1980 | Clausen | 428/911 |

Primary Examiner—Marion C. McCamish
Attorney, Agent, or Firm—Kane, Dalsimer, Kane, Sullivan and Kurucz

[57] ABSTRACT

The disclosure is of a penetration resistant panel which comprises plied layers of interwoven textile yarns of poly(p-phenylene terephthalamide) backed with plied layers of woven or non-woven fibers of Nylon 6,6. The panels of the invention are useful as ballistic-protective armor and are inherently lower in cost than similarly-effective panels comprised solely of poly(p-phenylene terephthalamide).

5 Claims, 3 Drawing Figures

PENETRATION RESISTANT TEXTILE PANELS WITH PLIES OF NYLON AND PLIES OF KEVLAR

BACKGROUND OF THE INVENTION

The United States Government has rights in this invention pursuant to contract DAAK60-81-C-0084 awarded by the Department of the Army.

FIELD OF THE INVENTION

The invention relates to textile panels and more particularly relates to layered assemblies of penetration resistant panels prepared using high tensile strength fibers.

BRIEF DESCRIPTION OF THE PRIOR ART

Representative of the prior art are disclosures given in the U.S. Pat. Nos. 3,891,996; 3,924,038; 3,958,276; 4,079,464; 4,183,097; 4,186,648; 4,199,388; 4,200,677; 4,287,607; 4,316,404; and 4,352,316.

Woven fabrics of poly(p-phenylene terephthalamide) yarns have been successfully used as components of a wide variety of soft body-armor articles. The present invention is of particular combinations of fabrics made of poly(p-phenylene terephthalamide) fiber and of polyamide fiber, wherein the diverse fabrics are plied together. The combinations of panels are advantageous in that they are lower in cost than panels heretofore made of all poly(p-phenylene terephthalamide) construction and they also exhibit favorable resistance to penetration by ballistic fragments.

SUMMARY OF THE INVENTION

The invention comprises a penetration resistant textile panel, which comprises;
a plurality of plies of woven poly(p-phenylene terephthalamide) yarns forming the face of said panel; and
a plurality of plies selected from the group consisting of needled, non-woven staple fibers of a polyamide and woven yarns of a polyamide, forming the back side of the panel;
said face plies comprising one-half to three-quarters by weight of said panel and said back side plies comprising one-quarter to one-half by weight of said panel.

The panels of the invention are flexible and may be formed, cut, sewn, etc. to fabricate armor, that is resistant to penetration by high velocity projectiles. These panels are significantly lower in cost than panels comprised solely of poly(p-phenylene terephthalamide) that provide equivalent protection levels.

DETAILED DESCRIPTION OF THE PREFERRED EMBODIMENTS OF THE INVENTION

Figure 1:
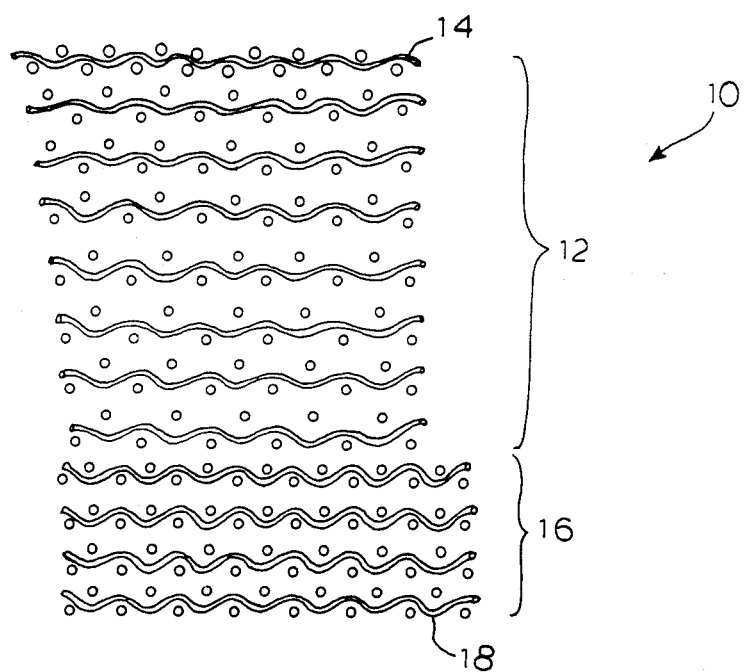
FIG. 1 is an exploded, schematic, side elevation of an embodiment panel of the invention.
Figure 2:
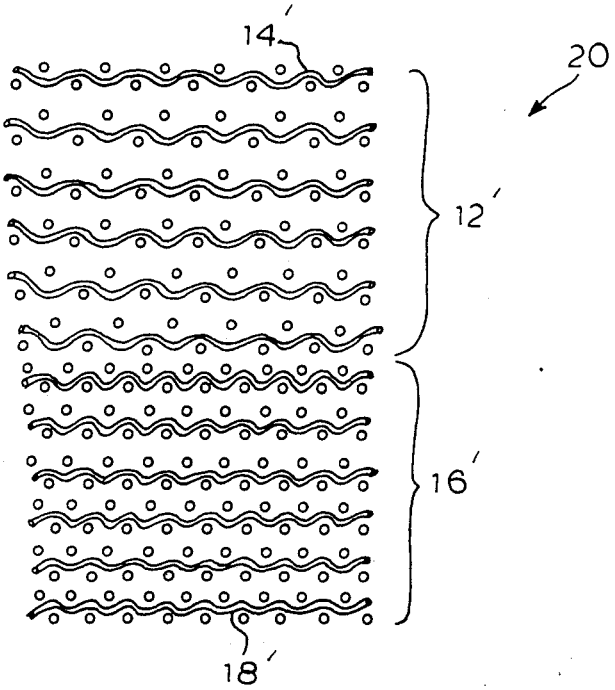
FIG. 2 is a view as in FIG. 1 of another embodiment panel of the invention.
Figure 3:
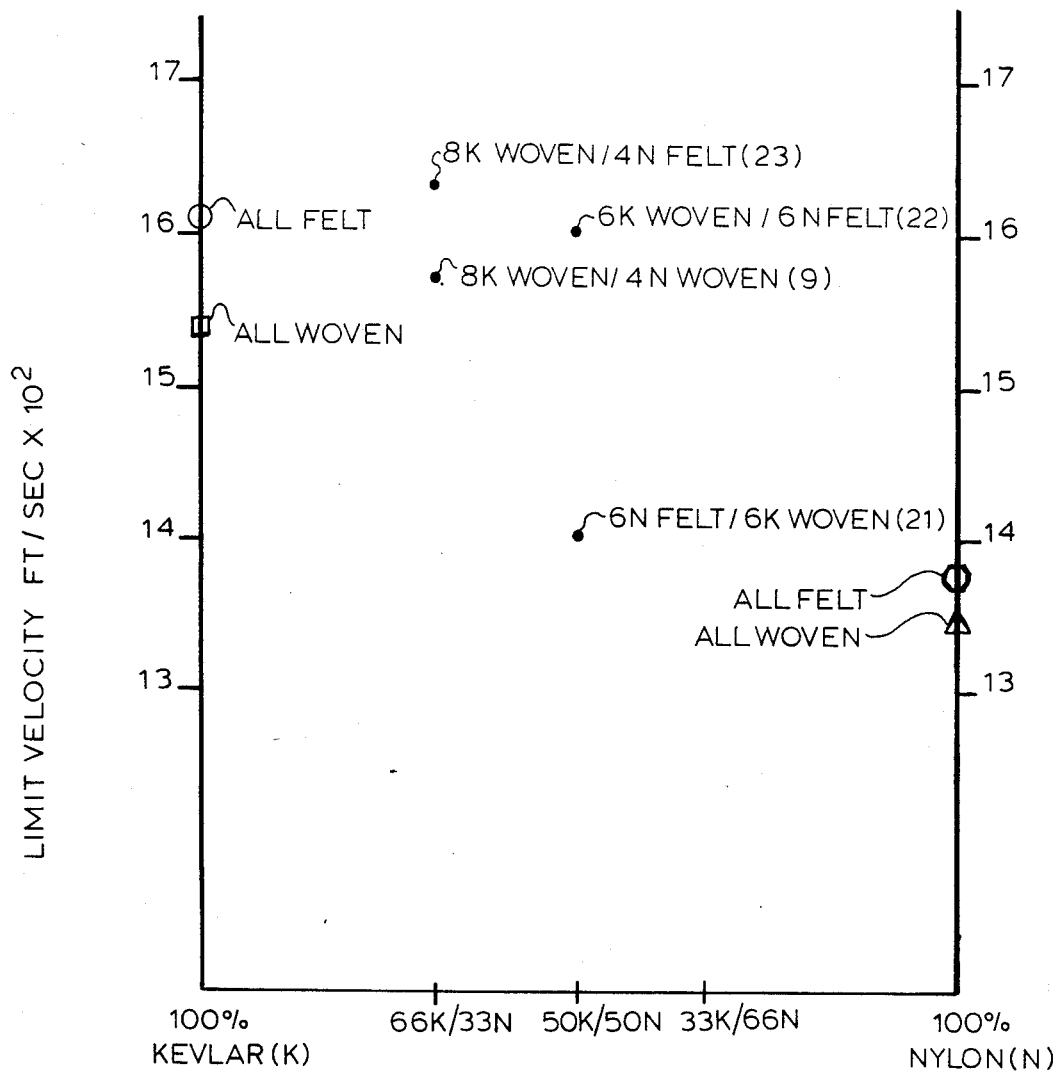
FIG. 3 is a graphical representation of the penetration resistance exhibited by various test panels of the invention and control panels.

Those skilled in the art will gain an appreciation of the invention from the following description, when read in conjunction with a viewing of the accompanying FIGS. 1–3, inclusive.

FIG. 1 is a schematic, side view, exploded, of a portion of a panel 10 of the invention. The embodiment panel 10 of the invention is made up of face plies 12 and backing plies 16. Each of the eight face plies 12 is made up of woven fabrics 14 plied together and with the base or support plies 16 which consists of four plies or layers of fabric 18 which are all plied together with the face plies 12. Each of the plies or layers of fabric 14 consists of interwoven yarns of poly(p-phenylene terephthalamide) which are commercially available under the trademark Kevlar. The fabric 18 employed in the base or support layer 16 consists of interwoven yarns of Nylon 6,6 which are also commercially available.

The Kevlar fiber yarns employed in fabric 14 are made up of a multiplicity of extremely fine filaments of poly(p-phenylene terephthalamide). The yarns are extremely strong and will absorb considerable kinetic energy from ballistic missiles which impinge upon the fabric. The yarns are sufficiently strong that they tend to cause metal bullets and the like to be slowed or stopped when advanced into engagement with the fabric 14.

In the past, armor barriers made up of a plurality of layers of Kevlar fabric such as the fabric 14, or other equivalent fabrics, required as many as 12 to 20 layers of the fabric 14 to provide the desired effect. The present invention allows one to reduce the need for that many layers of fabric 14.

The yarns making up the fabric 14 and the fabric 18 may be of a wide variety of denier, i.e., from about 200 to about 2,000 denier may be employed. Each of the fabric 14 or 18 plies may be woven in any conventional weave pattern, preferably a plain or basket weave. Weaving of the yarns constituting the fabrics 14 and 18 is advantageously carried out so as to provide fabrics with a weight of from about 6 to about 30 ozs. per square yard.

In an alternate embodiment panel of the invention, the backing plies or layers 16 may be non-woven plies or webs of Nylon 6,6 fibers provided they are of approximately the same weight as woven fabrics 18.

Preferably, each of the individual plies 14 will be approximately equivalent in thickness and weight to each of the plies of fabric 18.

FIG. 2 is a schematic representation as in FIG. 1, to show an embodiment panel 20 of the invention wherein similar parts are identified with the same numerical index, followed by an apostrophe. The difference between the panel 10 and the panel 20 resides in the number of facing layers 12, 12' and base layers 16, 16'. In the panel 20, there are six facing plies 12' and six base plies 16'. In the preferred embodiments of the invention, the number of respective plies found in the face 12, 12' and the base 16, 16' will lie within the ratio of 8:4–6:6. In general, such a ratio of plies provides panels 10, 20 wherein from one-half to three-quarters by weight of the panel is made up of the face plies 12, 12' whereas one-quarter to one-half by weight of the panels 10, 20 are made up of base or back side plies 16, 16'. It is within these number or weight ratios that the desired efficiency of missile stopping effect is obtained, while reducing the number of woven Kevlar plies required in the prior art.

Those skilled in the art will appreciate the techniques for plying together the layers of fabrics 14, 14' and 18, 18'. Details need not be recited herein.

The cost advantage of the invention described will also be readily apparent; relatively inexpensive nylon fiber is, in effect, substituted for inherently costly Kevlar fiber, with little or no decrease in protective capacity.

The following examples describe the manner and process of making and using the invention and set forth the best mode contemplated by the inventors of carrying out the invention, but is not to be construed as limiting.

Where test results are given, the reported tests were according to the following:

All ballistic experiments performed in the course of the work utilized the residual velocity-striking velocity ($V_r - V_s$) plotting technique to determine ballistic limit velocity. Ballistic tests were made with 17 grain Type 2, bevel nosed, hardened steel, fragment simulators (missle described in MIL SPEC MIL-P-46593) fired from a .22 caliber rifle.

Areal density in ounces/square yards ($oz/yd^2$) is obtained by dividing the weight of the panel in ounces by the face area (i.e., parallel to the fabric plane) in square yards. The areal density of all test panels was approximately 168 $oz/yd^2$ and was achieved by using twelve layers (or plies) of 14 $oz/yd^2$ fabric.

EXAMPLE 1

(A) A woven fabric of continuous filament, 1500 denier (nominal) yarns of poly(p-phenylene terephthalamide) (Kevlar, E. I. DuPont de Nemours and Co., Wilmington, Del.) having a minimum tenacity of 20.0 gms/denier, woven in a 2×2 basket weave with two ends as one and two picks weaving as one, is provided.

The fabric weight is 14 oz/sq. yd. and meets the minimum specifications of U.S. Military specification MIL-C-44050 for Type II fabric with the exception that the fabric has not been treated to enhance water repellency. The fabric is cut into a plurality of pieces suitable for assembly into multi-ply panels (approximately 12 inches × 15 inches).

(B) A plurality of woven fabric as described in (A) above (except said fabric was water-repellent treated to meet all minimum specification for Type II fabric under U.S. Military specification MIL-C-44050) is provided.

(C) A plurality of the 12″×15″ pieces of fabric provided in (A) or (B) above were assembled in different configurations to obtain a number of multi-ply panels, described as follows:

Fabric #2

Twelve plies of the fabric provided in (B) above.

Fabric #3

Twelve plies of the fabric provided in (A) above.

Fabric #9

Eight face plies of the fabric provided in (A) above were backed with four plies of woven ballistic Nylon cloth as specified in military specification MIL-C-12369D(GL). The backing plies each comprise 1050 denier multi-filament prepared from continuous filaments of polyamide prepared from the reaction of hexamethylene diamine and adipic acid (Nylon 6,6), woven in a 2×2 basket weave, with two ends weaving as one and two picks weaving as one.

Fabric #22

Six face plies of the fabric provided in (A) above were backed by six plies of a needled, non-woven felt DuPont polyamide fiber (Type P-113) of 4 inch staple length (plies are 0.15 inch thick, weight of 14 $oz/yd^2$).

Fabric #23

A fabric similar to fabric #9, supra, was prepared, except that the 4 backing plies consisted of 4 plies of the non-woven fabric described for fabric #22, supra.

Each of the fabrics #2, #3, #9, #22 and #23 were examined for their physical properties. The examination results are set forth in the Table, below.

| Fabric No. | Test Panel Description | Areal Density of Panel ($oz/yd^2$) | Approximate Panel Thickness (in.) | Ballistic Limit Velocity per $V_r - V_s$ Method (ft/sec) |
|---|---|---|---|---|
| 2 | Woven Kevlar per MIL-C-44050, Type II, water repellent treated, 12 plies | 158 | 0.34 | 1540 |
| 3 | As above, without water repellent treatment (control) | 166 | 0.32 | 1600 |
| 9 | Set of 8 woven Kevlar plies backed by set of 4 woven nylon plies (MIL-C-12369D) | 168 | 0.33 | 1570 |
| 22 | Set of 6 woven Kevlar plies backed by 6 nylon felt plies, 50K/50N by weight | 169 | 1.10 | 1600 |
| 23 | Set of 8 woven Kevlar plies backed by 4 nylon felt plies, 66K/33N by weight | 168 | 0.78 | 1630 |

The ballistic-protection advantage exhibited by three embodiments of the invention (Fabrics 9, 22 and 23) is readily apparent from a viewing of FIG. 3 of the accompanying drawings. The FIG. 3 is a graphical representation showing the limit velocity plotted as a function of the Kevlar/nylon ratio of test panels. Included in the diagram are control data for Kevlar felt, nylon felt, Kevlar woven fabric (MIL-C-44050, Type II) and nylon woven fabric (MIL-C-12369D). The construction of each of these four controls is thought to be nearly optimum in terms of ballistic performance. Data points for the three embodiments of the invention, shown as points (9), (22) and (23), illustrate the magnitude of the ballistic performance increase realized. Point (21) represents the limit velocity for a fabric #21 which consists of 6 face plies of non-woven nylon (as used in Fabric #22) backed by 6 plies of woven Kevlar (as used in Fabric #22). The data point for Fabric #21 has been plotted to illustrate the importance of Kevlar and nylon ply positioning within the test panel. Data point (22) is for a test panel that had six plies of woven Kevlar on the face side (the side toward the projectile source) and six plies of nylon felt on the back side. Identical component plies were used to assemble the panel of data point (21), but the face-to-back placement was reversed, with six nylon felt plies on the face side and six woven Kevlar plies on the back side. Placement of the woven Kevlar layers in front of the nylon layers provided a 200 ft/sec increase in limit velocity over the reverse configuration. The importance of positioning woven Kevlar layers on the face side was documented further through the evaluation of several analogous pairs of panel configurations. Another advantage that was demonstrated several times is the use of needle-felt rather than woven fabric for the back side layers. The magnitude of this advantage, about a 60 ft/sec increase in limit velocity, can be seen by comparing data-points (9) and (23). As seen from the above data, the invention is of an effective alternative to the multiple-ply, all-Kevlar fabric configuration that is the essential component in lightweight, fragment-protective vests. And importantly, the alternative panel constructions of the invention can be produced at much lower cost than similarly-effective all-Kevlar panels.

Those skilled in the art will appreciate that many modifications may be made to the above-described preferred embodiments without departing from the spirit and the scope of the invention. For example, the panels may be built up in thickness to include additional layers of the textile fabrics.

The invention provides penetration resistant panels that can be utilized in many applications. In addition to the primary intended use in lightweight, protective vests, thicker, heavier embodiments of the invention will be suitable for use as protective curtains and as armored liners in aircraft and land vehicles.

What is claimed:

1. A penetration resistant textile panel, which comprises;
    a plurality of plies of woven poly(p-phenylene terephthalamide) yarns forming the face of said panel; and
    a plurality of plies selected from the group consisting of needled, non-woven staple fibers of a nylon polyamide and woven yarns of a nylon polyamide, forming the back side of the panel;
    said face plies comprising one-half to three-quarters by weight of said panel and said back side plies comprising one-quarter to one-half by weight of said panel.

2. The panel of claim 1 wherein the total number of plies is 12.

3. The panel of claim 2 wherein there are from 6 to 8 plies of poly(p-phenylene terephthalamide) fabric and from 4 to 6 plies of polyamide fabric.

4. The panel of claim 1 wherein the polyamide plies are woven of polyamide yarns.

5. The panel of claim 1 wherein the polyamide plies are non-woven staple fibers.

* * * * *